United States Patent
Wang et al.

(10) Patent No.: US 9,816,666 B2
(45) Date of Patent: Nov. 14, 2017

(54) HAND HELD THREE-DIMENSIONAL PANORAMIC PAN-TILT KIT

(71) Applicant: WU HAN AIBIRD UAV CO., LTD., Wuhan (CN)

(72) Inventors: Xiaobo Wang, Wuhan (CN); Wen Zhou, Wuhan (CN); Dongzi Peng, Wuhan (CN); Fei He, Wuhan (CN)

(73) Assignee: WU HAN AIBIRD UAV CO., LTD., Wuhan (CN)

( * ) Notice: Subject to any disclaimer, the term of this patent is extended or adjusted under 35 U.S.C. 154(b) by 0 days.

(21) Appl. No.: 15/506,083

(22) PCT Filed: Jun. 3, 2016

(86) PCT No.: PCT/CN2016/084672
§ 371 (c)(1),
(2) Date: Feb. 23, 2017

(87) PCT Pub. No.: WO2017/140067
PCT Pub. Date: Aug. 24, 2017

(65) Prior Publication Data
US 2017/0241589 A1    Aug. 24, 2017

(30) Foreign Application Priority Data
Feb. 18, 2016    (CN) .......................... 2016 1 0089394

(51) Int. Cl.
*F16M 13/04*    (2006.01)
*F16M 11/08*    (2006.01)
(Continued)

(52) U.S. Cl.
CPC ............ *F16M 13/04* (2013.01); *F16M 11/08* (2013.01); *F16M 11/10* (2013.01); *H04N 5/2251* (2013.01)

(58) Field of Classification Search
None
See application file for complete search history.

(56) References Cited

U.S. PATENT DOCUMENTS

| 2010/0079101 | A1 | 4/2010 | Sidman | |
| 2013/0004153 | A1* | 1/2013 | McKee | F16M 11/041 396/420 |

(Continued)

FOREIGN PATENT DOCUMENTS

| CN | 203950109 U | 11/2014 |
| CN | 204141179 U | 2/2015 |

(Continued)

*Primary Examiner* — WB Perkey
(74) *Attorney, Agent, or Firm* — Ditthavong & Steiner, P.C.

(57) ABSTRACT

The present disclosure provides a hand-held three-dimensional panoramic pan-tilt kit, comprising a hand-held portion, a first motor, a second motor and a third motor that are perpendicular to each other in spatial positions, the first motor is located at a top end of the hand held portion, a first connecting arm is connected to the first motor, the other end of the first connecting arm is connected to the second motor, a second connecting arm is connected to the second motor, the other end of the second connecting arm is connected to the third motor, the third motor is fixedly connected with a connecting member, a front end of the connecting member is connected with a holding member, a first slip ring is arranged between a rotating shaft of the first motor and the first connecting arm, a second slip ring is arranged between a rotating shaft of the second motor and the second connecting arm, a third slip ring is arranged between a rotating shaft of the third motor and the connecting member. By using the slip rings, the present invention ensures 360-degree rotation of the first connecting arm, the second connecting arm and the connecting member during use of the pan-tilt kit, enables the pan-tilt kit to be suitable for a (Continued)

variety of shooting conditions and scenes, thus utilization ratio of the pan-tilt kit is significantly increased and consumers' demand for use is satisfied.

7 Claims, 2 Drawing Sheets

(51) Int. Cl.
  *F16M 11/10* (2006.01)
  *G03B 17/56* (2006.01)
  *H04N 5/225* (2006.01)

(56) References Cited

U.S. PATENT DOCUMENTS

| | | | |
|---|---|---|---|
| 2015/0076297 A1* | 3/2015 | Parrill | F16M 11/041 248/176.3 |
| 2015/0261070 A1* | 9/2015 | Feng | G03B 17/561 396/421 |
| 2016/0381271 A1* | 12/2016 | Cheng | F16M 11/041 348/208.2 |
| 2017/0089513 A1* | 3/2017 | Pan | F16M 13/022 |
| 2017/0146892 A1* | 5/2017 | Wei | G03B 17/561 |
| 2017/0192341 A1* | 7/2017 | Casarez | G03B 17/561 |

FOREIGN PATENT DOCUMENTS

| | | |
|---|---|---|
| CN | 204314728 U | 5/2015 |
| CN | 204856009 U | 12/2015 |
| CN | 204879354 U | 12/2015 |
| WO | 2015/101822 A1 | 7/2015 |

* cited by examiner

HAND HELD THREE-DIMENSIONAL PANORAMIC PAN-TILT KIT

TECHNICAL FIELD

The present invention relates to a device for fixing a photographing apparatus, more particularly, to a hand-held three-dimensional panoramic pan-tilt kit.

BACKGROUND ART

A variety of mobile phones are used by people in their daily life, which are different in size and weight. With the improvement of living standards, people are also pursuing the quality of life, and it has been very common for them to shoot a picture or video by using mobile phone camera. In order to improve the stability of photographing, people invented the pan-tilt kit, which is a support device for mounting and fixing a photographing apparatus, through adjustment of the pan-tilt kit, one can adjust the camera lens orientation of the photographing apparatus in order to accurately achieve observation and photographing of a target. The pan-tilt kit has a wide range of application, and a variety of special industry have certain requirements for pan-tilt kit products. In order to realize rotation of the existing pan-tilt kit, usually wire is exposed outside the pan-tilt kit, and when in use, the wire needed for rotation is very long. Therefore, it is necessary to reserve long enough wire, so that the exposed wire is very long, which leads to messy cabling and poor protection. In addition, the existing hand-held pan-tilt kit has a limited range of rotation angles, swing of lens thereof is restricted, which greatly limits the occasions and range for using the hand-held pan-tilt kit, resulting in a waste of resources of pan-tilt kits. Moreover, shooting opportunities in some specific occasions might be missed, and it is not possible to achieve omni-directional monitoring or photographing, resulting in a blind zone on coverage of the image, there are a certain extent of defects.

SUMMARY OF THE INVENTION

In view of the shortcomings of the above-mentioned prior art, the technical problem that the present invention solves is to provide a hand-held three-dimensional panoramic pan-tilt kit with simple structure and accurate positioning, which can carry out omni-directional monitoring or photographing, and realize the fixed mode of the mobile phone in various spatial positions and meet consumers' demand for shooting.

In order to solve the above technical problems, the present invention is achieved by the following technical solution: the present invention provides a hand-held three-dimensional panoramic pan-tilt kit, comprising a hand-held portion, a first motor, a second motor and a third motor that are perpendicular to each other in spatial positions, characterized in that, the first motor is located at a top end of the hand held portion, a first connecting arm is detachably connected to the first motor, the other end of the first connecting arm is connected to the second motor, a second connecting arm is detachably connected to the second motor, the other end of the second connecting arm is connected to the third motor, the third motor is fixedly connected with a connecting member, a front end of the connecting member is threadedly connected with a holding member by a thumb screw; the first motor is rotated about Z-axis, the second motor is rotated about X-axis, and the third motor is rotated about Y-axis; a first slip ring is arranged between a rotating shall of the first motor and the first connecting arm in order to transmit power and electric signal of the first motor to the first connecting arm, both ends of wire of the first slip ring are plug-in members, in which the plug-in member of one end is plugged and connected to a printed circuit board (PCB) inside the first motor in order to realize 360-degree rotation of the first connecting arm; a second slip ring is arranged between a rotating shaft of the second motor and the second connecting arm in order to transmit power and electric signal of the second motor to the second connecting arm, both ends of wire of the second slip ring are plug-in members, in which the plug-in member of one end is plugged and connected to a PCB inside the second motor in order to realize 360-degree rotation of the second connecting arm; a third slip ring is arranged between a rotating shaft of the third motor and the connecting member in order to transmit power and electric signal of the third motor to the connecting member, both ends of wire of the third slip ring are plug-in members, in which the plug-in member of one end is plugged and connected to a PCB inside the third motor in order to realize 360-degree rotation of the connecting member; the first slip ring, the second slip ring and the third slip ring have the same structure, each of which comprises a rotor and a stator electrically connected with the rotor, the rotors respectively are connected with one end of the first connecting arm, one end of the second connecting arm and one end of the connecting member, the rotating shafts of the first motor, the second motor and the third motor are respectively connected to the first connecting arm, the second connecting arm and the connecting member through the stators and the rotors; the rotor is provided with a plurality of electric contact points, the stator is provided with a plurality of loop circuits, the electric contact points and the loop circuits are electrically connected during rotation in order to transmit electrical power and signal to the first connecting arm, second connecting arm and connecting member.

As a preferred embodiment of the above-described technical solutions, the hand-held three-dimensional panoramic pan-tilt kit provided in the embodiments of the present invention further includes some or all of the following technical features:

As an improvement of the above-described solution, a control button which is electrically connected to the first motor, the second motor and the third motor, is arranged on the hand-held portion, rotation of the first motor, the second motor and the third motor is controlled by the control button so that omni-directional rotation of the holding member is driven. By using the slip ring instead of wires normally used in the prior art, overmany exposed wires can be avoided and the product is easy to install and of a nice appearance. By using the slip ring, 360-degree rotation of the first connecting arm, the second connecting arm and the connecting member is ensured during use of the pan-tilt kit, so that the hand-held pan-tilt kit is suitable for a variety of shooting conditions and scenes, utilization ratio of the pan-tilt kit is significantly increased.

As an improvement of the above-described technical solution, a groove is arranged at the front end of the connecting member, the middle part of said groove is opened with a through-hole, a thread part of the thumb screw passes through the through-hole, an end portion of the thumb screw is located inside the groove, the holding member is attached to the front end of the connecting member, providing more space for the holding member to ensure that the holding member can fix a photographing equipment of a larger size and dimension.

As an improvement of the above-described technical, in an embodiment of the present invention, the end portion of the thumb screw is provided with an elongated groove and a screw ring to facilitate screwing the thumb screw so as to manually adjust an angle of the holding member, in particular switch transversal and vertical placement of the holding member.

As an improvement of the above-described technical, a thread hole threadedly connected with the thread part of the thumb screw is arranged on the holding member.

In an embodiment of the present invention, preferably, the first connecting arm is fixed on a top end of the first motor in a screw connecting manner, the second connecting arm is connected to the second motor in a screw connecting manner, in this way the product is easy and convenient to install and disassemble, easy to maintain and of high adaptability.

Compared with the prior art, the technical solution of the present invention has the following beneficial effects: the hand-held three-dimensional panoramic pan-tilt kit uses slip ring instead of wires normally used in the prior art, thus overmany exposed wires can be avoided and the product is easy to install and of a nice appearance. By using the slip ring, 360-degree rotation of the first connecting arm, the second connecting arm and the connecting member is ensured during use of the pan-tilt kit, so that the hand-held pan-tilt kit is suitable for a variety of shooting conditions and scenes, utilization ratio of the pan-tilt kit is significantly increased, breadth of photography is increased, dead corners of photography is reduced, and it is convenient for a user to operate, and all the user needs to do is to press the button, which enhances the user's operating experience and meets consumers' demand, and solves the issue of low efficiency due to the user's own operation, resulting in a increased efficiency of photography. In addition, the hand-held three-dimensional panoramic pan-tilt kit adopts the three motors which are orthogonally distributed in space to control the first connecting arm, the second connecting arm and the connecting member separately, and the first connecting arm, the second connecting arm and the connecting member can rotate 360 degrees independently or cooperatively, and the adjustment is more flexible. The hand-held three-dimensional panoramic pan-tilt kit of the present invention can also be applied to various aspects for shooting purposes, which can rotate at a wide range of angles with good control, and can ensure the corresponding bearing weight, and is worth promoting application thereof.

The foregoing description is only an outline of the technical solution of the present invention, and in order that the technical means of the present invention may be more clearly understood and may be carried out in accordance with the contents of the specification, and in order that the above and other objects, features and advantages of the present invention can be more clearly understood, more detailed description will be provided below in combination with the preferred embodiments and with reference to the accompanying drawings.

BRIEF DESCRIPTION OF THE DRAWINGS

In order to more clearly illustrate the technical solutions of the embodiments of the present invention, the drawings of the embodiments will be briefly described.

DESCRIPTION OF THE PREFERRED EMBODIMENTS

Figure 1:
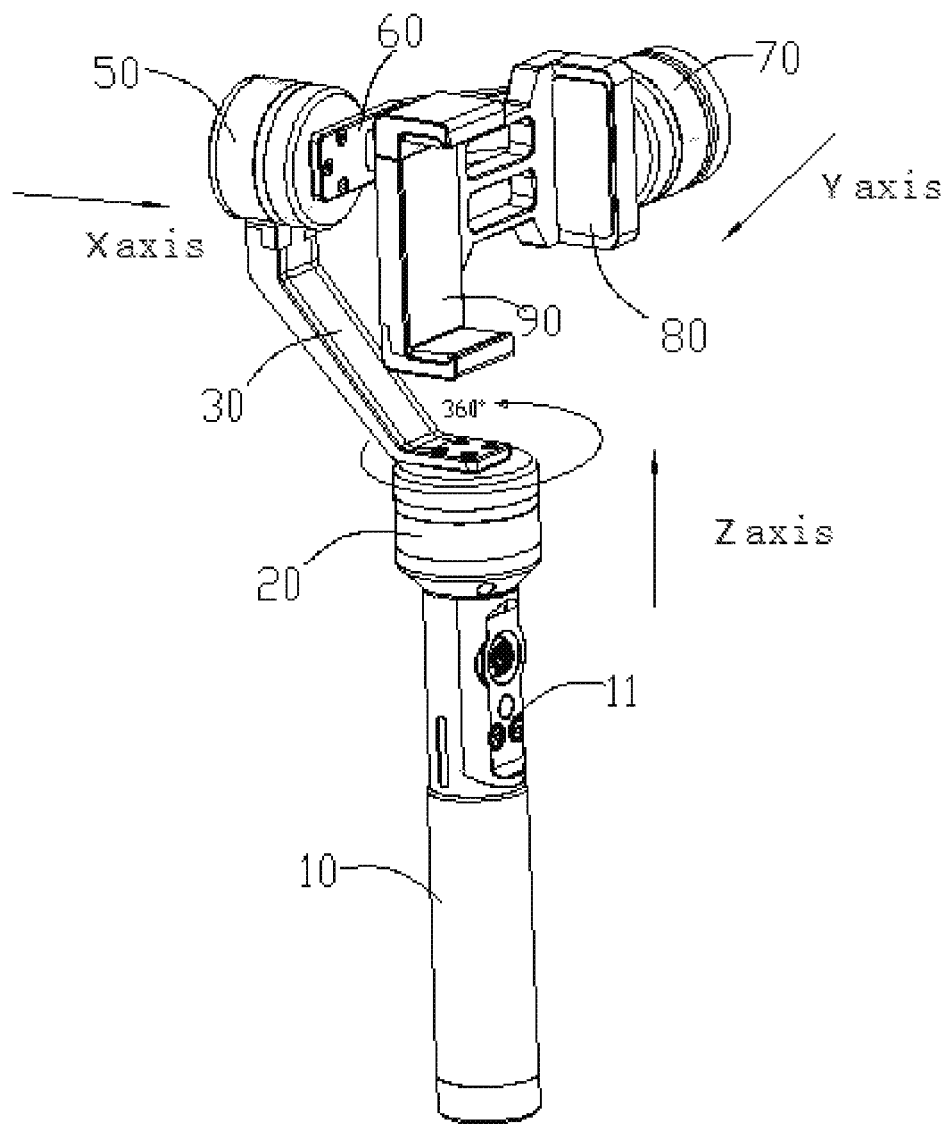
FIG. 1 is a schematic diagram of a hand-held three-dimensional panoramic pan-tilt kit of a preferred embodiment of the present invention.

With reference to the accompanying drawings, embodiments of the present invention, as a part of this specification, will be described in details below, which illustrate the principle of the present invention, other aspects, features and advantages of the present invention will become apparent from the detailed description. In the referred drawings, the same or similar parts in different figures are denoted by the same reference numerals.

Figure 2:
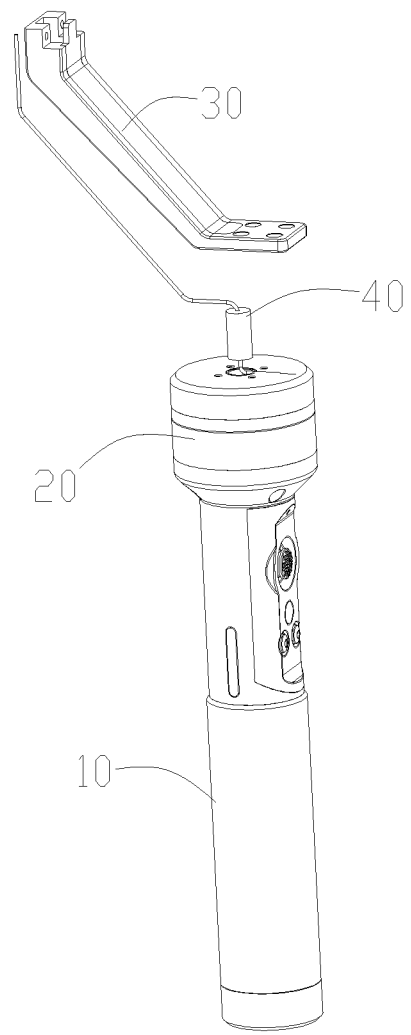
FIG. 2 is an exploded view of the rotation structure between the first motor and the first connecting arm of the hand-held three-dimensional panoramic pan-tilt kit of the preferred embodiment of the present invention.
Figure 3:
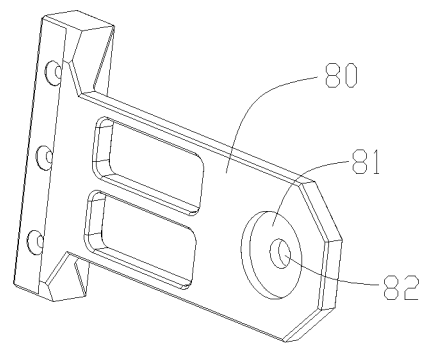
FIG. 3 is a schematic diagram of a connecting member of the hand-held three-dimensional panoramic pan-tilt kit of the preferred embodiment of the present invention.

FIGS. 1 to 3 show schematic diagrams of a hand-held three-dimensional panoramic pan-tilt kit of a preferred embodiment of the present invention, the hand-held three-dimensional panoramic pan-tilt kit of the present invention can be used for fixation of a photographing equipment such as a mobile phone, a compact video camera and the like.

The hand-held three-dimensional panoramic pan-tilt kit of the preferred embodiment of the present invention, comprises a hand-held portion 10, a first motor 20, a second motor 50 and a third motor 70 that are perpendicular to each other in spatial positions, wherein the first motor 20 is located at a top end of the hand held portion 10, a first connecting arm 30 is detachably connected to the first motor 20, the other end of the first connecting arm 30 is connected to the second motor 50, a second connecting arm 60 is detachably connected to the second motor 50, specifically, the first connecting arm 30 is fixed on a top end of the first motor 20 in a screw connecting manner, the second connecting arm 60 is connected to the second motor 50 in a screw connecting manner, in this way the first connecting arm 30 and the second connecting arm 60 are easy and convenient to install and disassemble, and easy to maintain; the other end of the second connecting arm 60 is connected to the third motor 70, the third motor 70 is fixedly connected with a connecting member 80, a front end of the connecting member 80 is threadedly connected with a holding member 90 by a thumb screw, the first motor 20 is rotated about Z-axis, the second motor 50 is rotated about X-axis, and the third motor 70 is rotated about Y-axis. A photographing equipment such as a mobile phone, a compact video camera and the like is fixed by the holding member 90 and omni-directional rotation of the lens of the photographing equipment can be realized by the functions of the first motor 20, the second motor 50 and the third motor 70 which are perpendicular to each other in the present invention, in the present invention the holding member 90 is attached to the front end of the connecting member 80 to provide more space reserved for the holding member 90 to allow the holding member 90 to fix a photographing equipment of a larger size and dimension.

As shown in FIG. 2, a first slip ring 40 is arranged between the rotating shaft of the first motor 20 and the first connecting arm 30 in order to transmit power and electric signal of the first motor 20 to the first connecting arm 30, both ends of wire of the first slip ring 40 are plug-in members, in which the plug-in member of one end is plugged and connected to a PCB inside the first motor in order to realize 360-degree rotation of the first connecting arm 30; a second slip ring is arranged between the rotating shaft of the second motor 50 and the second connecting arm 60 in order to transmit power and electric signal of the second motor 50 to the second connecting arm 60, both ends of wire of the second slip ring are plug-in members, in which the plug-in member of one end is plugged and connected to a PCB inside the second motor in order to realize 360-degree rotation of the second connecting arm; a third slip ring is arranged between the rotating shaft of the third motor 70 and the connecting member 80 in order to transmit power and electric signal of the third motor 70 to the connecting member, both ends of wire of the third slip ring are plug-in members, in which the plug-in member of one end is plugged and connected to a PCB inside the third motor in order to realize 360-degree rotation of the connecting member, with 360-degree rotation of the first connecting arm 30, the second connecting arm 60 and the connecting member 80, the pan-tilt kit is enables to be suitable for a variety of shooting conditions and scenes, the pan-tilt kit is fit for a variety of photographing conditions and scenes, thus utilization ratio of the pan-tilt kit is significantly increased and breadth of photography is increased, and dead corners of photography is reduced.

Specifically, the first slip ring 40, the second slip ring and the third slip ring have the same structure, each of which comprises a rotor and a stator electrically connected with the rotor, the rotors respectively are connected with one end of the first connecting arm 30, one end of the second connecting arm 60 and one end of the connecting member 80, the rotating shafts of the first motor 20, the second motor 50 and the third motor 70 are respectively connected to the first connecting arm 30, the second connecting arm 60 and the connecting member 80 through the stators and the rotors; the rotor is provided with a plurality of electric contact points, the stator is provided with a plurality of loop circuits, the electric contact points and the loop circuits are electrically connected during rotation in order to transmit electrical power and signal to the first connecting arm 30, second connecting arm 60 and connecting member 80, 360-degree rotation of the first connecting arm 30, second connecting arm 60 and connecting member 80 is driven correspondingly by the first motor 20, the second motor 50 and the third motor 70.

Further, in an embodiment of the present invention, a control button 11 which is electrically connected to the first motor 20, the second motor 50 and the third motor 70, is arranged on the hand-held portion 10, rotation of the first motor 20, the second motor 50 and the third motor 70 is controlled by the control button 11 so that omni-directional rotation of the holding member 90 is driven.

Certainly, the present invention may also employ a controller that remotely communicates with the first motor 20, the second motor 50 and the third motor 70, to remotely control rotation of the first motor 20, the second motor 50 and the third motor 70, so as to drive omni-directional rotation of the holding member 90. At least three operation modes of the hand-held three-dimensional panoramic pan-tilt kit can be switched by the control button 11 or the controller: in the first mode, the first motor 20, the second motor 50 or the third motor 70 can be controlled individually; in the second mode, the second motor 50 and the third motor 70 can be controlled to rotate at the same time; in the third mode, the first motor 20, the second motor 50 and the third motor 70 can be locked to prevent motion of the pan-tilt kit during shooting from impacting the quality of shooting, and to improve the precision of positioning.

More specifically, as shown in FIG. 3, a groove 81 is arranged at the front end of the connecting member 80, the middle part of said groove 81 is opened with a through-hole 82, a thread part of the thumb screw passes through the through-hole 82, an end portion of the thumb screw is located inside the groove 81, the thumb screw is attached stably to the front end of the connecting member 80 through the groove 81 and the through-hole 82, a thread hole threadedly connected with the thread part of the thumb screw is arranged on the holding member 90, and thus the connecting member 80 and the holding member 90 are fixedly connected together by using the thumb screw.

Preferably, the end portion of the thumb screw is provided with an elongated groove and a screw ring to facilitate screwing of the thumb screw so as to manually adjust an angle of the holding member 90, in particular switch transversal and vertical placement of the holding member 90, in order to acquire a landscape shooting effect and a portrait shooting effect for photographing equipments such as a mobile phone, a compact video camera and the like.

There is no particular limitation for the specific shapes of the first connecting arm 30, the second connecting arm 60, the connecting member 80 and the holding member 90 in the present invention, and those skilled in the art can foresee that the first connecting arm 30, the second connecting arm 60, the connecting member 80, and the holding member 90 perform a function of connection and fixation, 360-degree rotation of the hand-held pan-tilt kit and omni-directional rotation of the lens of a photographing equipment can also be realized when the shape of any one component is changed, therefore it is also within the scope of protection of the present invention if only the shapes of the first connecting arm 30, the second connecting arm 60, the connecting member 80 and the holding member 90 are changed without changing the inventive concept of the present invention.

When using the hand-held three-dimensional panoramic pan-tilt kit of the present invention, the photographing equipment such as a mobile phone or a compact video camera and the like is fixed to the holding member 90, and the first connecting arm 30 is fixed to a top end of the first motor 20 in a screw connecting manner, meanwhile the slip ring 40 is arranged between the rotating shaft of the first electric motor 20 and the first connecting arm 30, and the plug-in member of one end of the wire of the slip ring 40 is plugged and connected to a PCB inside the first electric motor 20 and then the second motor 50, the second connecting arm 60, the third motor 70, the connecting member 80 and the holding member 90 are installed in order, while the second slip ring and the third slip ring are sequentially mounted between the second motor 50 and the second connecting arm 60, and between the third motor 70 and the connecting member 80. After the installation of the respective parts, the rotation of the first motor 20, the second motor 50 and the third motor 70 is controlled by controlling the control button 11 or the controller on the hand-held portion 10, and thus 360-degree rotation of the first connecting arm 30, the second connecting arm 60 and the connecting member 80 is driven, thereby omni-directional rotation of the photographing equipment such as a mobile phone and a compact video camera and the like is driven, omni-directional monitoring or photographing can be conducted and the need of the consumers for shooting can be satisfied.

The hand-held three-dimensional panoramic pan-tilt kit according to the present invention uses slip ring instead of wires normally used in the prior art, thus overmany exposed wires can be avoided and the product is easy to install and of a nice appearance. By using the slip ring, 360-degree rotation of the first connecting arm 30, the second connecting arm 60 and the connecting member 80 is ensured during use of the pan-tilt kit, so that the hand-held pan-tilt kit is suitable for a variety of shooting conditions and scenes, utilization ratio of the pan-tilt kit is significantly increased, breadth of photography is increased, dead corners of photography is reduced, and it is convenient for a user to operate, and all the user needs to do is to press the button, which enhances the user's operating experience and meets consumers' demand, and solves the issue of low efficiency due to the user's own operation, resulting in a increased efficiency of photography. In addition, the hand-held three-dimensional panoramic pan-tilt kit adopts the three motors which are orthogonally distributed in space to control the first connecting arm 30, the second connecting arm 60 and the connecting member 80 separately, and the first connecting arm 30, the second connecting arm 60 and the connecting member 80 can rotate 360 degrees independently or cooperatively, and the adjustment is more flexible. The hand-held three-dimensional panoramic pan-tilt kit of the present invention can also be applied to various aspects for shooting purposes, which can rotate at a wide range of angles with good control, and can ensure the corresponding bearing weight, and is worth promoting application thereof.

The foregoing is only preferred embodiments of the present invention, which are not intended to limit the present invention, any modifications, substitution to same object and improvement made within the spirit and principles of the present invention, should be included within the protection scope of the present invention.

What is claimed is:

1. A hand-held three-dimensional panoramic pan-tilt kit, comprising a hand-held portion, a first motor, a second motor and a third motor that are perpendicular to each other in spatial positions, characterized in that, the first motor is located at a top end of the hand held portion, a first connecting arm is detachably connected to the first motor, the other end of the first connecting arm is connected to the second motor, a second connecting arm is detachably connected to the second motor, the other end of the second connecting arm is connected to the third motor, the third motor is fixedly connected with a connecting member, a front end of the connecting member is threadedly connected with a holding member by a thumb screw;

the first motor is rotated about Z-axis, the second motor is rotated about X-axis, and the third motor is rotated about Y-axis;

a first slip ring is arranged between a rotating shaft of the first motor and the first connecting arm in order to transmit power and electric signal of the first motor to the first connecting arm, both ends of wire of the first slip ring are plug-in members, in which the plug-in member of one end is plugged and connected to a printed circuit board (PCB) inside the first motor in order to realize 360-degree rotation of the first connecting arm;

a second slip ring is arranged between a rotating shaft of the second motor and the second connecting arm in order to transmit power and electric signal of the second motor to the second connecting arm, both ends of wire of the second slip ring are plug-in members, in which the plug-in member of one end is plugged and connected to a PCB inside the second motor in order to realize 360-degree rotation of the second connecting arm;

a third slip ring is arranged between a rotating shaft of the third motor and the connecting member in order to transmit power and electric signal of the third motor to the connecting member, both ends of wire of the third slip ring are plug-in members, in which the plug-in member of one end is plugged and connected to a PCB inside the third motor in order to realize 360-degree rotation of the connecting member, the first slip ring, the second slip ring and the third slip ring have the same structure, each of which comprises a rotor and a stator electrically connected with the rotor, the rotors respectively are connected with one end of the first connecting arm, one end of the second connecting arm and one end of the connecting member, the rotating shafts of the first motor, the second motor and the third motor are respectively connected to the first connecting arm, the second connecting arm and the connecting member through the stators and the rotors; the rotor is provided with a plurality of electric contact points, the stator is provided with a plurality of loop circuits, the electric contact points and the loop circuits are electrically connected during rotation in order to transmit electrical power and signal to the first connecting arm, second connecting arm and connecting member.

2. The hand-held three-dimensional panoramic pan-tilt kit according to claim 1, characterized in that, a control button which is electrically connected to the first motor, the second motor and the third motor, is arranged on the hand-held portion, rotation of the first motor, the second motor and the third motor is controlled by the control button so that omni-directional rotation of the holding member is driven.

3. The hand-held three-dimensional panoramic pan-tilt kit according to claim 1, characterized in that, a groove is arranged at the front end of the connecting member, the middle part of said groove is opened with a through-hole, a thread part of the thumb screw passes through the through-hole, an end portion of the thumb screw is located inside the groove.

4. The hand-held three-dimensional panoramic pan-tilt kit according to claim 3, characterized in that, the end portion of the thumb screw comprises an elongated groove and a screw ring.

5. The hand-held three-dimensional panoramic pan-tilt kit according to claim 3 or 4, characterized in that, a thread hole threadedly connected with the thread part of the thumb screw is arranged on the holding member.

6. The hand-held three-dimensional panoramic pan-tilt kit according to claim 1, characterized in that, the first connecting arm is fixed on a top end of the first motor in a screw connecting manner.

7. The hand-held three-dimensional panoramic pan-tilt kit according to claim 1, characterized in that, the second connecting arm is connected to the second motor in a screw connecting manner.

* * * * *